United States Patent [19]

Shimizu et al.

[11] Patent Number: 4,956,245
[45] Date of Patent: Sep. 11, 1990

[54] FUEL CELL COOLING PLATE

[75] Inventors: Hiroshi Shimizu; Takashi Harada; Kaoru Kondoh; Yoshiji Kobayashi, all of Kanagawa, Japan

[73] Assignee: Fuji Electric Co., Ltd., Kanagawa, Japan

[21] Appl. No.: 300,983

[22] Filed: Jan. 24, 1989

[30] Foreign Application Priority Data

Feb. 4, 1988 [JP] Japan .................................. 63-24801
Oct. 20, 1988 [JP] Japan .................................. 63-264320

[51] Int. Cl.⁵ .................................................... H01M 8/02
[52] U.S. Cl. .......................................... 429/26; 429/36
[58] Field of Search ........................................ 429/26, 36

[56] References Cited

U.S. PATENT DOCUMENTS 4,233,369 11/1980 Breault et al. ......................... 429/36
4,583,583 4/1986 Wittel ..................................... 429/26

Primary Examiner—Donald L. Walton
Attorney, Agent, or Firm—Finnegan, Henderson, Farabow, Garrett and Dunner

[57] ABSTRACT

There is disclosed a fuel cell cooling plate for eliminating waste heat generated by operation of a fuel cell. The cooling plate consists of an inner substrate layer composed of a soft, deformable plastic or low elastic carbonaceous material, sandwiched between outer substrate layers of a strong gas-impermeable carbonaceous material, and a sealing material. The inner substrate is chased with grooves, which house metal cooling pipes for passage of the cooling medium. The soft, deformable, plastic or low elastic material of the inner substrate can be formed so that the grooves fit tightly around the cooling pipes, preventing formation of any air gaps between the pipes and the grooves. This permits nearly complete circumferential contact between the pipes and the grooves, thereby reducing thermal resistance associated with air gaps, and maintaining a high degree of heat transfer. Further, the plastic or low elastic material of the inner substrate layer can conform to thermal expansion and contraction of the cooling plate and pipes, reducing excessive wear over the lifetime of the cooling plate.

4 Claims, 2 Drawing Sheets

FUEL CELL COOLING PLATE

BACKGROUND OF THE INVENTION

1. Field of the Invention

The present invention relates to a cooling plate structure, incorporated into a fuel cell stack, for eliminating waste heat generated by a fuel cell, using water as a cooling medium.

2. Description of the Related Art

FIG. 5 illustrates a conventional fuel cell stack equipped with a conventional cooling plate. In FIG. 5, a single-cell 1 is composed of a matrix layer 11 for holding an electrolyte, a fuel pole 12, an oxidizer pole 13, electrode bases 14 and 15 each formed with ribs, and separators 16. A plurality of the thus constructed single-cells 1 are laminated to form a cell stack 2. Water-cooling type cooling plates 3 are disposed in the cell stack at several-cell intervals. Each cooling plate 3 is formed as an assembled body comprising: a carbon cooling substrate 4, the thermal expansion coefficient of which is substantially equal to those of the electrode bases 14 and 15 formed with the ribs and of the separator 16; and metallic cooling pipes 5 arranged in parallel and embedded in a layer of the cooling substrate 4. The cooling pipes 5 are connected as a bank to a header pipe 6 and further connected to an external cooling water supply line (not shown).

Embedding the cooling pipes 5 into the cooling substrate 4 requires a pipe arrangement wherein the cooling pipes 5 are accommodated in a plurality of pipe grooves sandwiched between adjoining parallel surfaces of two cooling substrates. An alternate arrangement is a plurality of U-shaped pipe grooves chased in the surface of the single cooling substrate 4, with such pipe grooves provided with a cover formed of the same carbon material as the substrate after placing the respective cooling pipes 5 therein. Note that the cooling plate 3 is used for removing the waste heat generated by the cell by causing the cooling pipes 5 to admit a cooling medium, for example water, supplied from the outside during steady-state operation of the fuel cell. The fuel cell cooling plate 3 also serves an additional function of increasing the fuel cell body temperature from a low temperature to a starting temperature during fuel cell activation, by causing hot water to flow through the cooling pipes 5.

There are, however, some drawbacks to the conventional apparatus. It is quite difficult to completely set the entire peripheral surfaces of the cooling pipes 5 in total circumferential physical contact with the pipe groove surfaces of the cooling substrate 4 due to dimensional tolerances of the cooling pipes and processing inaccuracies in forming the pipe grooves in the cooling substrate 4. It is inevitable that there will exist slight air gaps between the outer pipe circumferences and surfaces of the grooves. A thermal resistance associated with the air gaps is substantially greater than that of the cooling substrate 4 and the cooling pipes 5. Hence, if even a small number of such air gaps exist between the cooling pipes 5 and the pipes grooves of the cooling substrate 4, heat transfer declines remarkably.

A method has been developed to attempt to cope with this problem, in which the apparatus is designed with the residual air gaps filled with a charging substance. This substance is produced by mixing a graphite-loaded ceramic material, having a high heat transfer coefficient, with thermosetting resin after the cooling pipes 5 have been placed in the pipe grooves of the cooling substrate 4. The charging substance reduces the thermal resistance existing between the cooling substrate 4 and the cooling pipes 5.

The above-mentioned structure for a cooling plate has, however, also produced unsatisfactory results when the fuel cell is operated. For example, in the above-described construction, the thermosetting resin is disposed between the cooling substrate and the cooling pipes in order to bond them together. A high degree of heat transfer is achieved during the early stages of operation. However, because of a difference in the thermal expansion coefficients between the metallic cooling pipes 5 and the carbon cooling substrate 4, the thermal resistance between the cooling pipes 5 and the solid charging substance increases with exposure to numerous heat cycles. In particular, operations involving repetitive starting and stopping of the fuel cell result in exfoliation of the charging substance during long stretches of use. Further, unnecessary thermal stress acts on the cooling substrate 4, attributable to the difference in thermal expansion coefficients between the cooling substrate 4 and the cooling pipes 5. In the worst case, this can result in cracks in the carbon cooling substrate 4.

SUMMARY OF THE INVENTION

Accordingly, it is a primary object of the present invention to provide a fuel cell cooling plate which is capable of being formed with minimal dimensional tolerances between the grooves in the cooling substrate and the cooling pipes, so that the cooling pipes are set in close contact with the cooling substrate by eliminating even slight air gaps between them, thereby obtaining a high degree of stable heat transfer.

In order to achieve the above object, and in accordance with the purposes of the invention as embodied and broadly described herein, a fuel cell cooling plate is provided, formed as a laminated body composed of an inner substrate layer formed of two connected deformable porous carbonaceous plates having plasticity or low elasticity, having upper and lower external surfaces and peripheral side surfaces, the inner substrate layer being chased with pipe grooves, and outer substrate layers defined as two gas-impermeable carbonaceous plates each having a high strength, the outer substrate layers being superimposed on and bonded to the upper and lower external surfaces respectively, of the inner substrate layer.

Based on such a construction, the inner substrate layer involves the use of the porous carbonaceous plate formed of a binder added to a carbon fiber material. This fiber material and binder mixture is calcined after being press-molded under a proper pressure. The deformable porous carbonaceous plate has plasticity or low elasticity.

The outer substrate layers involve the use of dense carbon plates formed of a binder added to, for example, graphite powder, and this graphite powder and binder mixture is calcined after being press molded. The outer substrate layers perform two functions. First, the outer layers function as separators for hindering air from permeating in between single-cells incorporated into the cell stack. Further, the outer layers facilitate treatment of the cooling plate when assembling the cell stack, reinforcing the relatively fragile inner substrate layer. The peripheral side surfaces of the inner substrate layer are provided with seal members to prevent air or a reactive gas supplied via a manifold from permeating the inner substrate layer.

In the apparatus, the cooling pipes are arranged in the cooling plate with the inner substrate layer deformed in order to absorb dimensional errors between the pipe grooves formed in the inner substrate layer, and the cooling pipes. A close fit is thereby effected, with no residual air gap between the cooling pipes and the grooves. Hence, it is feasible to obtain the high degree of heat transfer desired between the cooling plate and the cooling pipes. Further, the deformable inner substrate layer acts to absorb the difference in thermal expansion between the cooling pipes and the cooling plate during operation of the fuel cell, with the result that unnecessary stress does not act on the cooling plate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENTS

Reference will now be made in detail to the present preferred embodiments of the invention as illustrated in the accompanying drawings.

FIGS. 1, 2, 3, and 4 are sectional views illustrating different embodiments of fuel cell cooling plates incorporating the teachings of the present invention. The components corresponding to those depicted in FIG. 5, the conventional fuel cell cooling plate, are marked with the same symbols.

Figure 1:
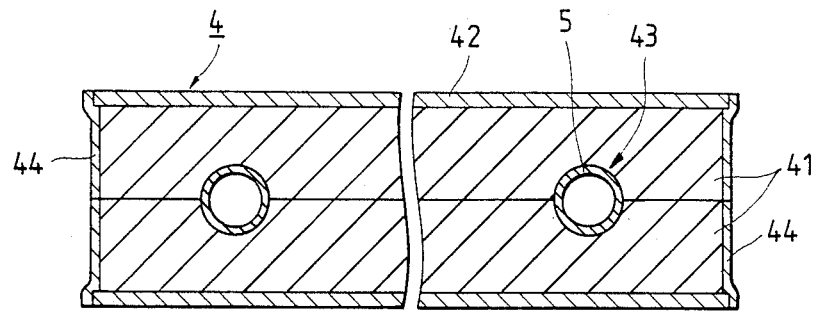
FIG. 1 is a side sectional view of a fuel cell cooling plate incorporating the teachings of the present invention.

In the embodiment of FIG. 1, a cooling plate 4 comprises a laminated body including an inner substrate layer 41 having upper and lower external surfaces in which a plurality of cooling pipes 5 are arranged, and outer substrate layers 42, sandwiching the inner substrate layer 41, and fixedly superimposed on the upper and lower external surfaces, respectively, of the inner substrate layer 41. The pipe arrangement is disposed so that the cooling pipes 5 are placed in a plurality of pipe grooves 43, one pipe groove 43 per cooling pipe 5, chased in the inner substrate layer 41. The inner substrate layer 41 is made of, for example, a pair of connected deformable porous carbonaceous plates having plasticity or low elasticity, having an upper and lower surface and peripheral side surfaces. A porous carbonaceous plate of this type can be formed by the steps of adding a binder, for example phenololic resin, to, for instance, carbon fiber and calcining the carbon fiber and binder mixture after being press-molded by applying an adequate pressure thereon. In contrast, the outer substrate layers 42 are made of high-strength, gas-impermeable carbonaceous plates. Each of the gas-impermeable carbonaceous plates is formed by adding a binder to, for example, graphite powder, and the graphite powder and binder mixture is calcined after being press-molded under a high pressure. The inner substrate layer 41 and the outer substrate layers 42 are joined into one united body by simultaneously calcining and bonding them to each other.

By way of illustration, the inner substrate layer 41 comprises two connected plates with opposing parallel surfaces joined together, with a plurality of pipe grooves 43 chased in the adjoining surfaces. The cooling pipes 5 are tightly accommodated in the pipe grooves 43. In this example, each individual pipe groove 43 is originally formed with an internal diameter smaller than an external diameter of the corresponding cooling pipe 5. When the cooling pipes are fitted in the pipe grooves, the cooling pipes 5 are sandwiched in between the upper and lower adjoining plates while the adjoining plates are compressed and united. Outer peripheral side surfaces of the cooling plate 4 are provided with seal layers 44, such as fluorinated hydrocarbon resin films, for preventing the permeation of air or a reactive gas from side portions into the inner porous substrate layer 41 via a manifold.

The thus constructed cooling plates are assembled in between single-cells at several-cell intervals as a cell stack. Subsequently, the complete cooling plate assembly is fastened in a laminating process. The cell stack is thus assembled. Since the outer substrate layers 42 of the cooling plate 4 are gas-impermeable, the outer substrate layers 42 may also function as separators. Therefore, conventional separators 16 interposed in a single-cell 1 contiguous to the cooling plate 3 in a conventional cell stack structure depicted in FIG. 5, can be omitted from the structure.

In the above-described configuration, with the cooling pipes arranged in the cooling plate 4, deformation of the inner substrate layer 41 itself serves to absorb dimensional errors caused between the pipe grooves 43 chased in the inner substrate 41 and the cooling pipes 5. A close fit is thus attained, without slight air gaps between the cooling pipes 5 and the pipe grooves 43. As a result, a high degree of heat transfer between the cooling plate 4 and the cooling pipes 5 can be achieved. Further, the inner substrate layer 41 also serves to absorb any difference in thermal expansion between the cooling plate 4 and the cooling pipes 5 during operation of the fuel cell. Therefore, unnecessary stress is less likely to act on the cooling plate 4.

Figure 2:
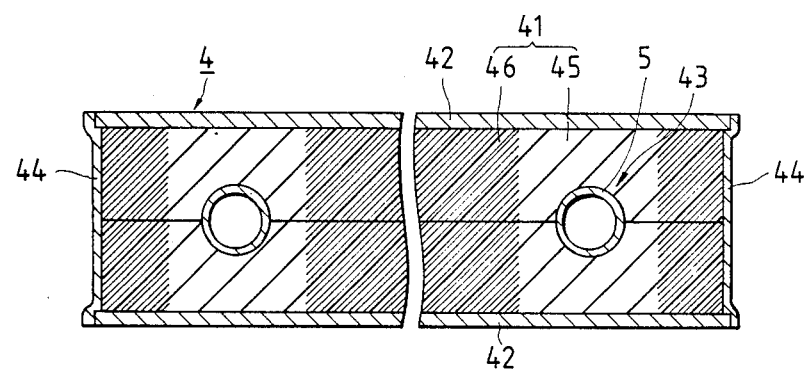
FIG. 2 is a side sectional view of another embodiment of the present invention.

FIG. 2 illustrates another embodiment, which further develops the embodiment of FIG. 1. In this embodiment, the inner substrate 41 includes sparse regions 45 and dense regions 46, wherein the carbon materials are alternately disposed in varying densities, so that sparse regions 45 have a low density of carbon, and adjacent dense regions 46 have a high density of carbon. The cooling pipes 5 are provided in the sparse regions 45. The sparse regions 45 and the dense regions 46 are formed by varying a charging rate of the carbon fiber material for every region when manufacturing the first substrate layer.

As explained above, the inner substrate layer 41 includes the sparse and dense regions 45 and 46, respectively, and the cooling pipes 5 are disposed in grooves chased in the sparse regions 45. It is therefore feasible to obtain the desired close-fit between the cooling pipes 5 and the sparse regions 45 and also achieve the high heat transfer rate therebetween. Additionally, conductive passageways each having a small electric resistance can be provided in the dense regions 46.

Figure 3:
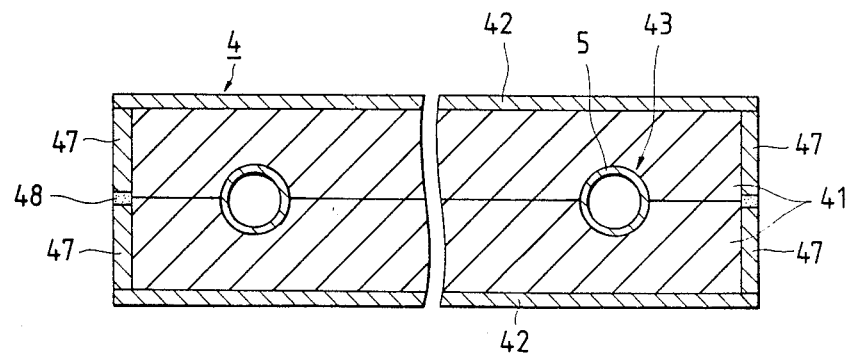
FIG. 3 is a side sectional view of another embodiment of the present invention, corresponding substantially to the embodiment of FIG. 1.
Figure 4:
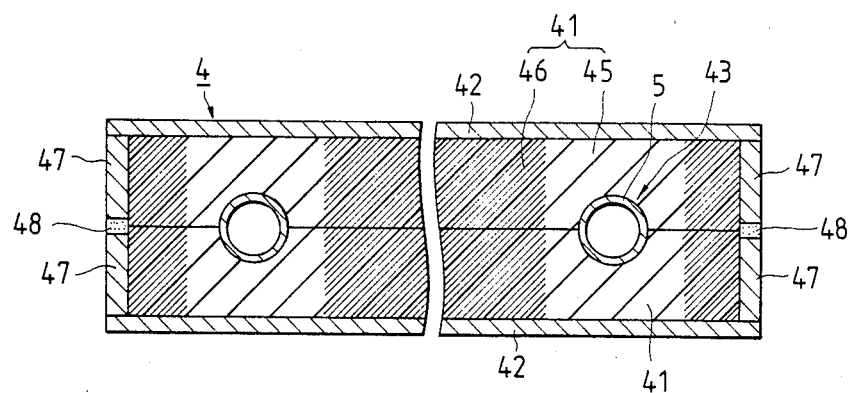
FIG. 4 is a side sectional view of another embodiment of the present invention, corresponding substantially to the embodiment of FIG. 2.
Figure 5:
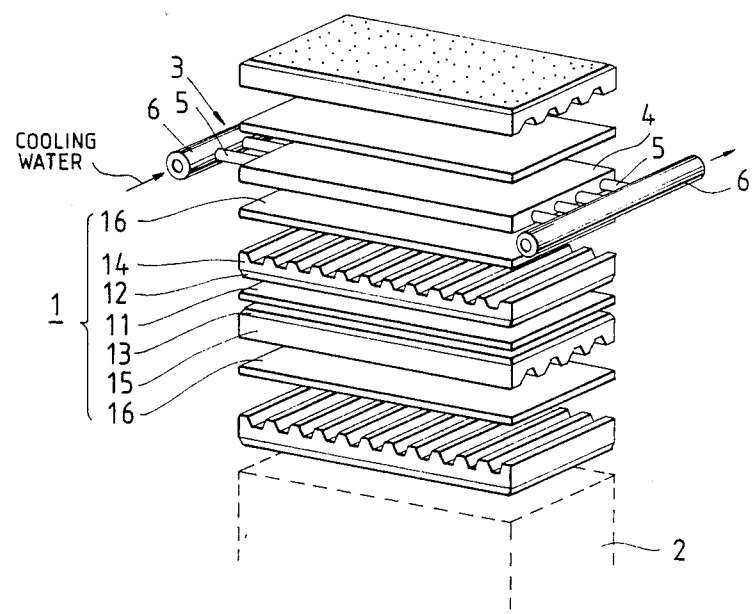
FIG. 5 is a detailed plan view of a conventional fuel cell cooling plate.

FIGS. 3 and 4 show additional embodiments corresponding substantially to the embodiments of FIGS. 1 and 2, respectively. In FIGS. 3 and 4, the peripheral side surfaces of the inner substrate layer 41 are provided with gas impermeable portions 47, instead of film seal layers 44, with a gap disposed between the portions, as shown for example in FIGS. 1 and 2. The gas impermeable portions 47 comprise dense carbonaceous plates formed of a binder added to, for example, graphite powder. The graphite powder and binder mixture is calcined after being press molded in the same manner as the outer substrate layers 42. Further, the gas-impermeable portions 47 may be united with the inner substrate layer 41 by calcining the gas impermeable portions 47 simultaneously with the calcining of the first substrate layer 41. Seal layers 48 enclose the peripheral side surfaces of the first substrate layer 41 in the gap left between the gas impermeable portion 47 to prevent permeation of external reacting gas into the inner substrate layer 41.

Further, both the seal layers 44, as shown in FIGS. 1 and 2, and the gas impermeable portions 47, as shown in FIGS. 3 and 4, are operative to prevent permeation of external reacting gas. Therefore, either the seal layers 44 or the gas impermeable portion 47 may be selectively employed as sealing means when the cooling plate 4 is assembled.

As discussed above, the structure of the fuel cell cooling plate according to the present invention comprises the laminated body consisting of the inner substrate layer, constructed from a deformable porous carbonaceous plate having plasticity or low elasticity, with pipe grooves chased in the porous carbonaceous plate, and the outer substrate layers each defined as gas-impermeable carbonaceous plates having high strength being superimposed on and bonded to both external surfaces of the inner substrate layer. The inner substrate layer is deformed to absorb the dimensional errors between the cooling pipes and the pipe grooves of the substrate, whereby the cooling pipes can be closely fitted in the grooves in the inner substrate. Consequently, a high degree of heat transfer can be obtained. Further, the outer substrate layers possess high strength and gas-impermeability, thus reinforcing the relatively fragile inner substrate layer. The cooling plate as a single unit can readily be replaced when assembling the cell stack. The outer substrate layers also serve as single-cell separators for preventing permeation of air or reactive gas. Thus, a reliable fuel cell cooling plate is obtained with excellent heat transfer characteristics.

Additional advantages and modifications will readily occur to one skilled in the art. The invention in its broader aspects is, therefore, not limited to the specific details, representative apparatus and illustrative example shown and described. Accordingly, departures may be made from such details without departing from the spirit or scope of the applicants' general inventive concept.

What is claimed is:

1. A fuel cell cooling pate operative to eliminate waste heat generated by a fuel cell by permitting a cooing medium to flow therein, comprising:
    an inner substrate layer, having top and bottom external planar surfaces substantially parallel to one another, and peripheral side surfaces between said top and bottom external surfaces, said inner substrate layer consisting of two plates of a plastic or low elastic first material with opposite parallel surfaces joined together, said first material including alternating adjacent sparse and dense regions, with a plurality of substantially parallel grooves chased into the sparse regions of the material therebetween;
    outer substrate layers of a second material, connectably abutting said inner substrate layer at the top and bottom external surfaces, respectively;
    a plurality of cylindrical hollow pipes disposed in said grooves with full circumferential contact between said pipes and the walls of said grooves, operative to carry said cooling medium; and
    sealing means for enclosing the peripheral side surfaces of said inner substrate layer and preventing permeation of reacting gas into the inner substrate.

2. The fuel cell cooling plate of claim 1 wherein said plastic or low elastic first material is a deformable porous carbonaceous fiber plate.

3. The fuel cell cooling plate of claim 2 wherein said deformable carbonaceous plate is molded so that no air gaps exist between said pipes and said grooves.

4. The fuel cell cooling plate of claim 1 wherein said second material is a high-strength gas-impermeable carbonaceous plate.

* * * * *